April 11, 1950          S. T. CARTER          2,503,864
CONVEYER MECHANISM FOR DISTRIBUTING
ARTICLES TO MACHINES
Filed May 2, 1945                        5 Sheets-Sheet 1
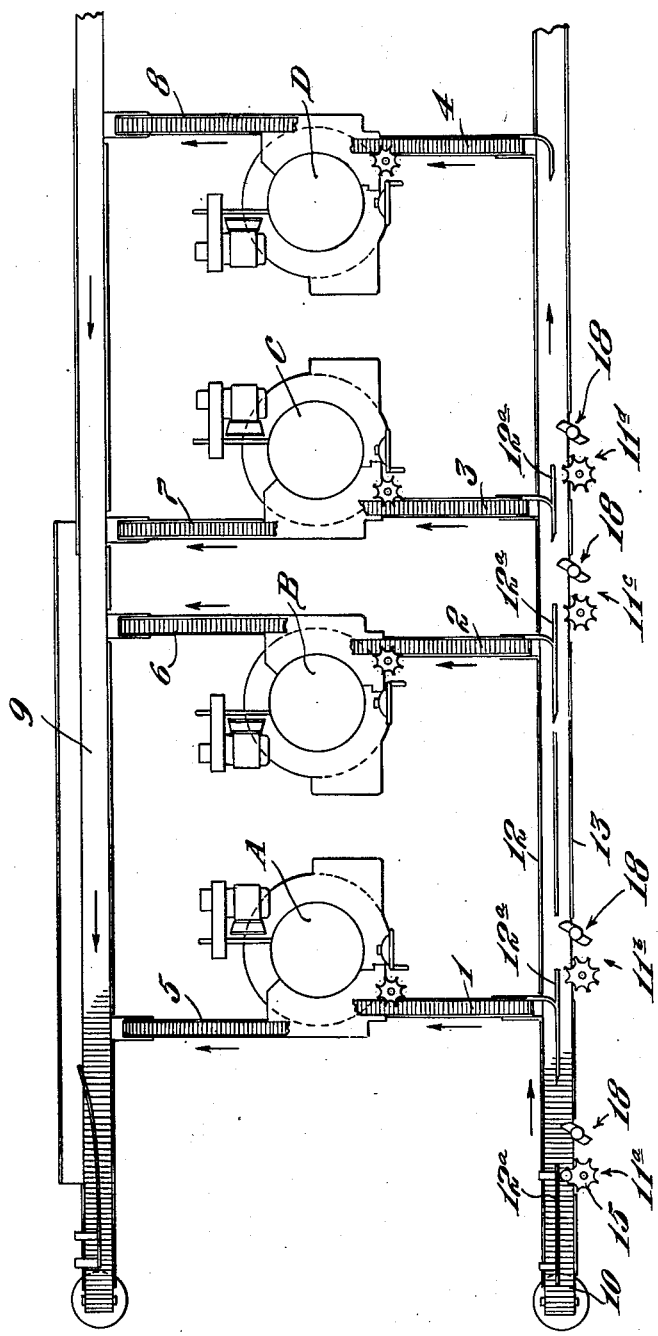
Inventor
Sidney T. Carter
by Roberts Cushman Grover
att'ys.

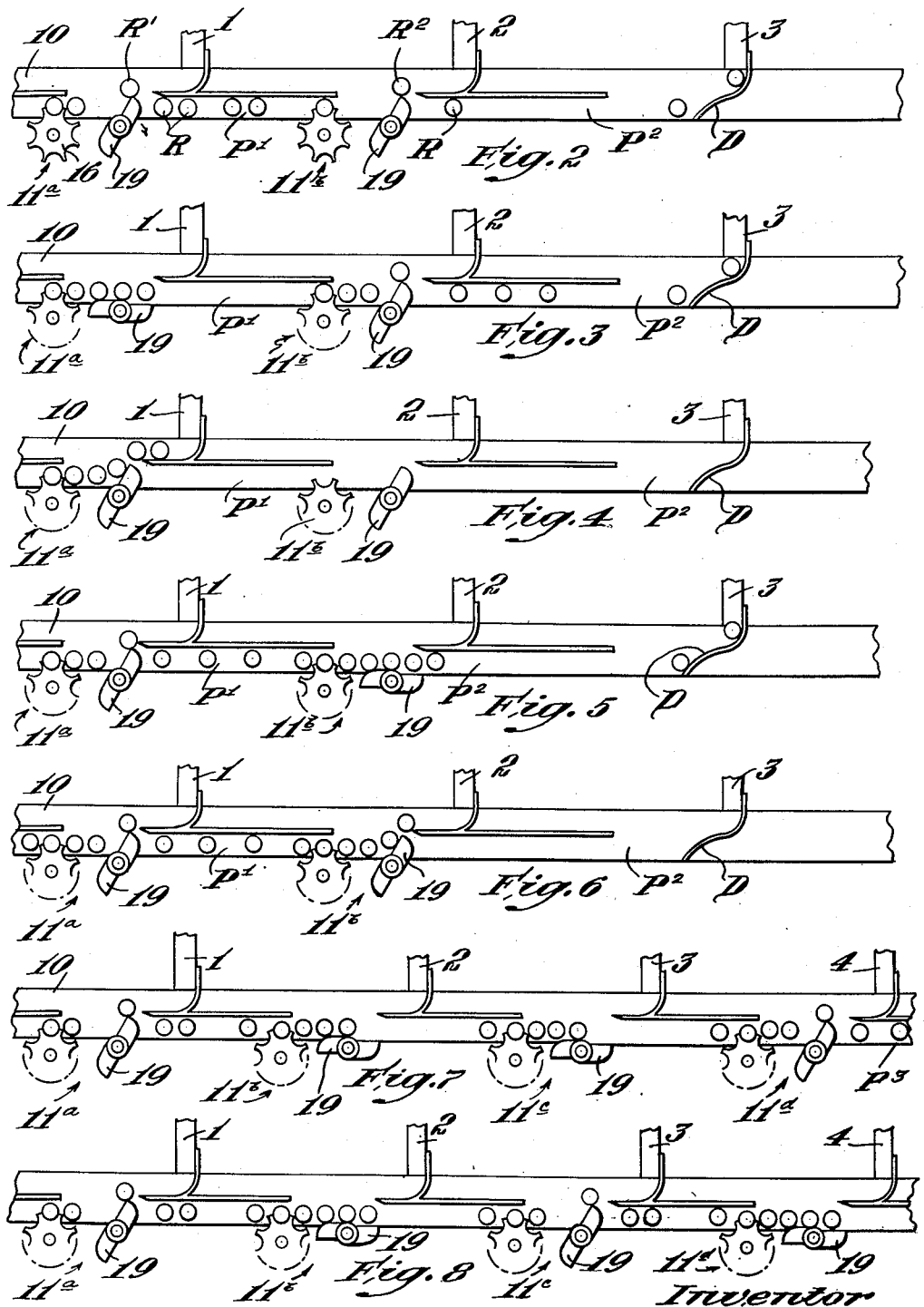

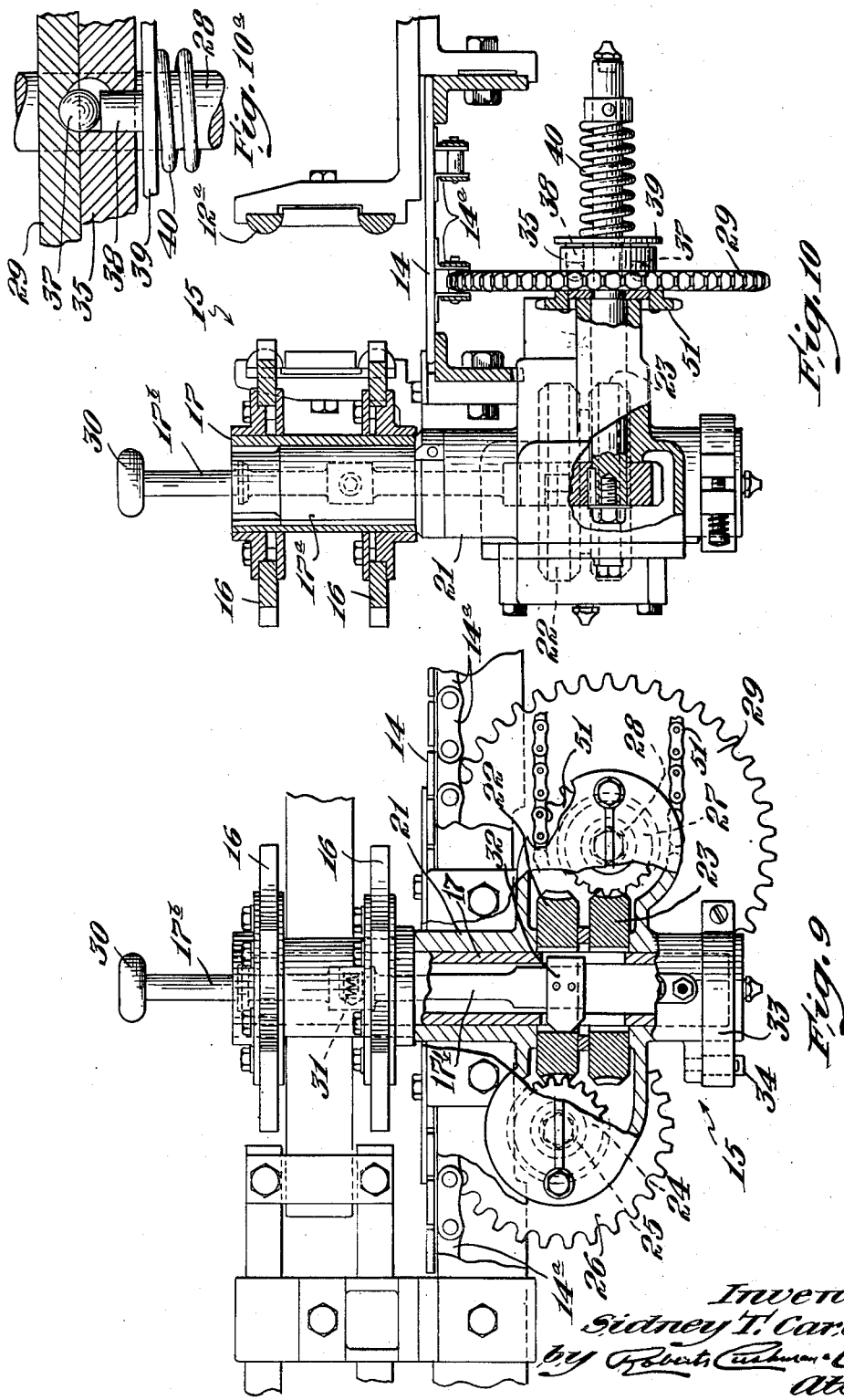

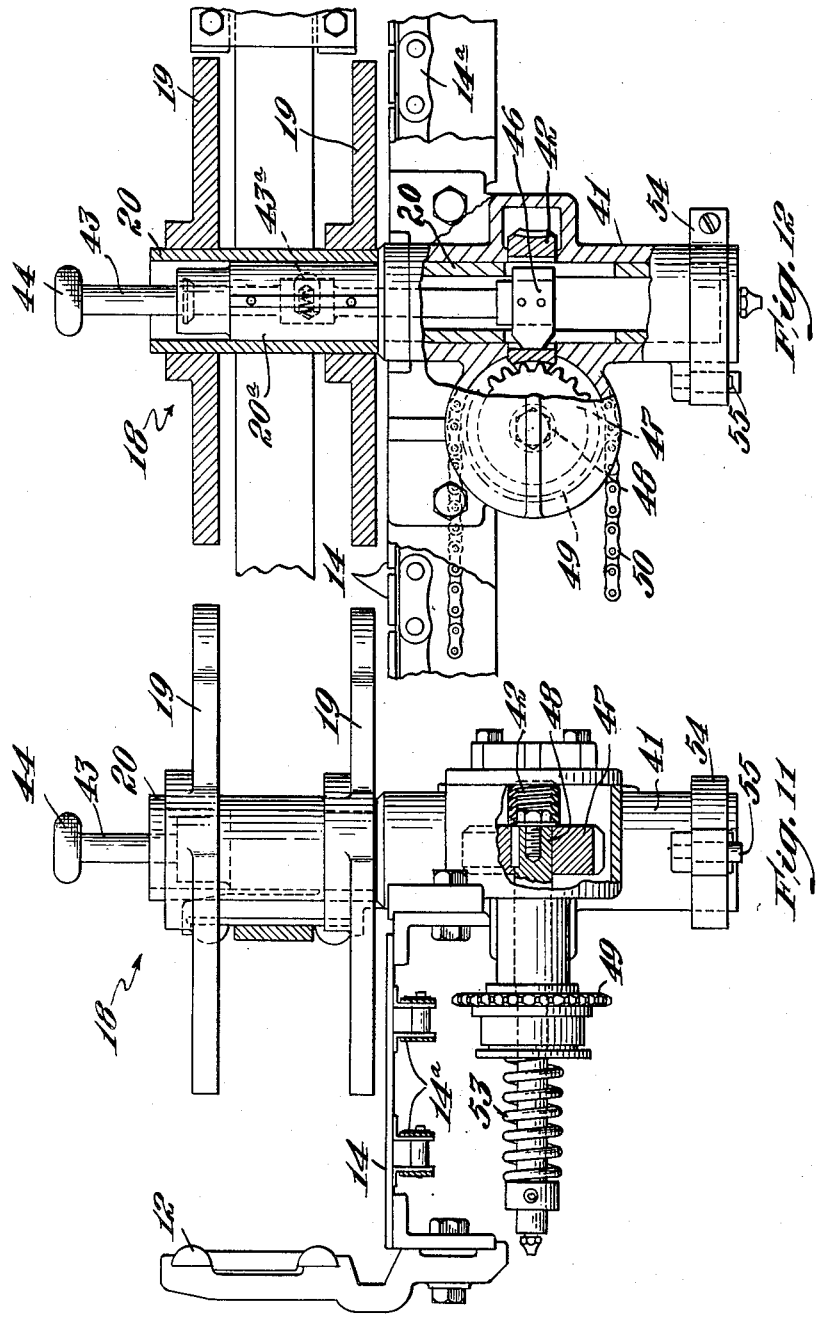

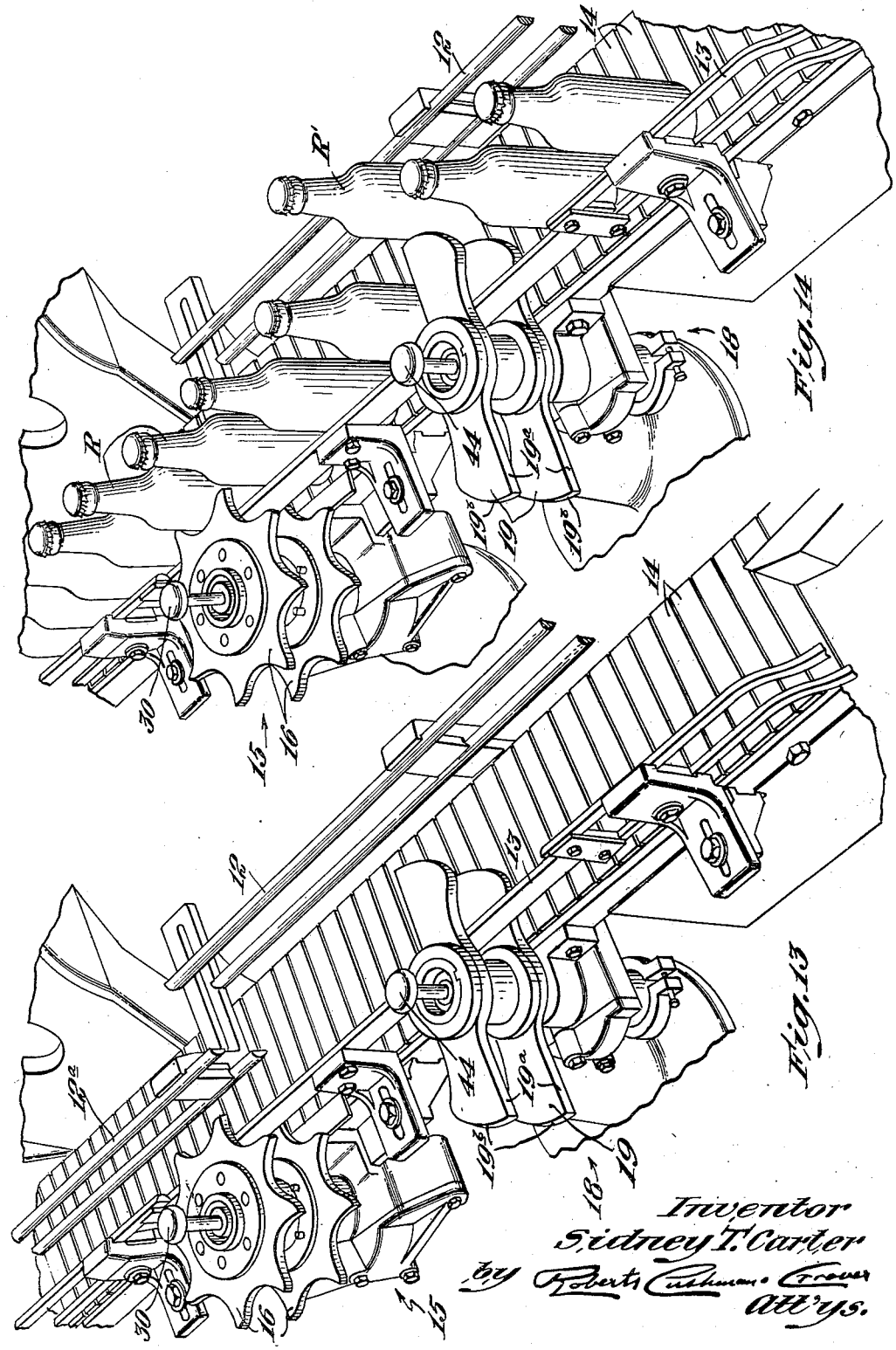

Patented Apr. 11, 1950

2,503,864

UNITED STATES PATENT OFFICE 2,503,864

CONVEYER MECHANISM FOR DISTRIBUTING ARTICLES TO MACHINES

Sidney T. Carter, Worcester, Mass., assignor to Economic Machinery Company, Worcester, Mass., a corporation of Massachusetts Application May 2, 1945, Serial No. 591,618

24 Claims. (Cl. 198—81)

This invention pertains to conveyors and more especially to article-separating or distributing mechanism for use in combination with a conveyor chain or belt on which like articles are supported and which is operative to move recurrent articles, for instance each second or third article, transversely of the belt or chain from the position in which it approaches the separating or distributing mechanism to a predetermined different position.

While of general utility wherever it is desirable to segregate recurrent conveyor-supported articles into two or more distinct groups, it is of particular value for distributing conveyor-supported articles preparatory to diverting them into different paths, respectively. As a particular example, it is useful in directing recurrent conveyor-supported articles, for instance bottles, cans or other containers thereby to divide them into groups respectively for delivery to each of several treating units or mechanisms each designed, for instance, to fill or close the article or apply a label.

Customarily, the division of carrier-supported articles into groups has heretofore been accomplished by the use of fixed or sometimes yieldably supported plows, together with suitable guide rails or similar devices. In dealing with articles which are capable of withstanding substantial blows without injury, such prior types of separating means are reasonably acceptable, although very noisy and subject to frequent jamming, but when it is attempted to separate such articles as thin glass bottles in this way, substantial breakage results. Breakage of a bottle in the machine not only means loss of the bottle and its contents but also the stoppage of the machine to clear out the broken glass, and it is also a possible source of injury to the operator. Furthermore, such prior types of separating or distributing means, when used for distributing the articles to two or more independently driven labeling machines or the like, frequently act uncertainly and inefficiently, especially when one or another of such machine units is not in operation.

A principal object of the present invention is to provide power-driven separator or distributing mechanism operative, by engagement with recurrent conveyor-supported articles (but not with the intervening articles) to move said recurrent articles transversely of the conveyor and to a definite predetermined part of the latter. A further object is to provide improved separating or distributing means which is readily adjustable to select articles recurring at different intervals, for example each second or third article. A further object is to provide improved separator or distributor means operative to segregate carrier-supported articles for delivery as distinct groups, each to one of a plurality of successive machines, and capable of functioning equally well when any one or more of said machines is out of action. A further object is to provide improved separator or distributor means capable of acting with substantially equal facility whether the articles approach the distributor mechanism in close order or with uniform or non-uniform spacing. A further object is to provide improved separating and distributing means capable of receiving conveyor-supported articles approaching in close, open or irregular order and of segregating recurrent articles and spacing all articles at selected distances or multiples of such selected distances apart.

A further object is to provide improved distributor mechanism useful for dividing carrier-supported articles into distinct groups and which is applicable either singly or in multiple to a conveyor chain serving two or a much greater number of machine units. Other and further objects and advantages of the invention will be pointed out in the following more detailed description and by reference to the accompanying drawings in which Fig. 1 is a diagrammatic plan view illustrating a preferred application of the present invention to a system including four operating units;

Figs. 2 to 8 inclusive are diagrams illustrating the application of the device of the present invention to systems including three or four operating units, and indicating its mode of operation when all or less than all of said units are simultaneously operating;

Fig. 9 is a fragmentary front elevation, with certain parts broken away, showing the dividing mechanism constituting a part of the present invention;

Fig. 10 is an end elevation, partly broken away and partly in vertical section, of the device shown in Fig. 9;

Fig. 10ª is a fragmentary section, showing details of a safety drive mechanism.

Fig. 11 is a fragmentary front elevation, partly in vertical section, illustrating the switch or transfer device of the present invention;

Fig. 12 is a fragmentary end elevation, with certain parts broken away and in section, of the device shown in Fig. 11; and Figs. 13 and 14 are perspective views showing the device of the present invention arranged in cooperation with a conveyor, Fig. 13 showing the conveyor empty and Fig. 14 showing the conveyor supporting a series of bottles.

In Fig. 1 the characters A, B, C and D indicate operating units of a series, of which there may be a greater or lesser number than that here illustrated. These operating units are independently driven mechanisms, usually all of the same kind and which for convenience may here be referred to as label-applying machines, although it is to be understood that the invention is broadly applicable to conveyor-served operating units of any type. As illustrated, each of these units A, B and C etc. is driven by an individual motor and each unit may be stopped or started independently of the others.

As illustrated in Fig. 1, the units A, B, C, etc. are supplied with articles to be operated on by individual conveyors 1, 2, 3, 4, etc. and each of these units delivers the articles, after they have been operated upon, to individual conveyors 5, 6, 7, 8, etc., respectively, all of which, as illustrated, deliver the articles to a single conveyor 9 which carries them away to any desired point, for example to a machine for wrapping and packing them. As illustrated in Fig. 1, the articles for all of the operating units A, B, C, D, etc. are brought from a source of supply by means of an endless conveyor 10 from which the articles are diverted onto the conveyors 1, 2, 3, etc. by the separator means of the present invention. As here illustrated, one unit 11ª, 11ᵇ, 11ᶜ, 11ᵈ, etc. of the improved separator means of the present invention is arranged in advance of each of the individual conveyors 1, 2, 3, etc. However, when the number of operating units A, B, C, etc. is limited, it may not be necessary to employ a separator unit 11 in advance of each of these individual conveyors, since the rate at which the articles are supplied to the last units of the series by the conveyor 10 may be so low that the ordinary stationary plow type of separator may suffice. However, by reason of its smoothness of operation and capability of adjustment, it is preferable to employ a separator of the type forming the immediate subject matter of the present invention in advance of each of the individual conveyors 1, 2, 3 etc.

Each of the separator units or devices of the present invention comprises counting, dividing or spacing mechanism 15 (Figs. 1, 9, 10, 13 and 14) operative to space the articles on the conveyor 10 at regular intervals. This dividing and spacing mechanism, as here illustrated, comprises two vertically spaced star wheels 16 carried by an elongate tubular hub 17 and constituting a rotary gate. As illustrated, these star wheels have eight article-receiving recesses, but it is within the scope of the invention to provide them with a lesser or greater number of recesses in accordance with the conditions of use, it being understood that the driving mechanism would be correspondingly modified. The separator device 18 of the present invention also includes rotary transfer or switch means (Figs. 1, 11, 12, 13 and 14) spaced from the mechanism 15 in the direction of travel of the articles along the conveyor. As here illustrated the conveyor 10 comprises parallel plates or slats 14 (Figs. 9, 11, 13 and 14) mounted upon endless chains 14ª, suitably driven, the slats or plates 14 being of a width transversely of the conveyor substantially greater than the horizontal thickness of the article to be supported, so that the articles, while supported by the conveyor, may occupy either of two parallel and distinct paths. To keep the articles from escaping from the supporting members 14 of the conveyor, guide rails 12 and 13 may be provided, the rail 12 having an offset portion 12ª opposite the spacer mechanism 15, thereby to confine the articles so that they may be effectively engaged by the star wheels 16.

The transfer mechanism 18 comprises a pair of article-engaging switch members 19 spaced vertically of an elongate tubular hub 20, each of the members 19 comprising two arms arranged 180° apart. Preferably each of these arms has a substantially straight edge 19ª substantially radial of the hub 20, and a smoothly rounded cam surface 19ᵇ at its outer end.

Referring to Figs. 9 and 10, the tubular hub 17 of the star wheels 16 is keyed to a hollow shaft 17ª which turns in bearings in a casing 21 which may be suitably secured to the frame of the conveyor 10. The shaft 17ª is a tubular shaft turning, as shown, about a vertical axis. Within a chamber in the casing 21, two gears 22 and 23, spaced vertically apart, are mounted so as to turn freely on the shaft 17ª. The gear 22 constantly meshes with a gear 24 mounted on a shaft 25, which is fast to a sprocket 26 which engages one of the chains 14ª of the conveyor 10. The gear 23 constantly meshes with a gear 27 mounted on a shaft 28, which is fast to a sprocket 29 which also engages one of the supporting chains 14ª of the conveyor. Within the hollow shaft 17ª there is arranged a vertically movable plunger 17ᵇ having a knob or handle 30 at its upper end by means of which it may be moved up and down, and having at an intermediate point a spring-pressed latch 31 (Fig. 9) engageable with either of a pair of recesses at the inside of the shaft 17ª, thereby to hold the plunger in either of two selected positions of adjustment. Near its lower end the plunger 17ᵇ is furnished with a clutch key 32 (Fig. 9) which is engageable by movement of the plunger 17ᵇ, with either of the gears 22 or 23, thereby at will to clutch either of these gears to the shaft 17ª so as to turn the latter. Preferably, at its lower end, the shaft 17ª is embraced by a brake shoe 33 secured by a pin 34 to the casing or frame 21.

As illustrated in Fig. 10, a collar 35 is arranged coaxially with the sprocket 29, the latter having four recesses in its adjacent face, designed to receive balls 37 which are housed within chambers in the collar 35. As shown in detail in Fig. 10ª, the recesses are so shaped that the balls act as ratchet elements, providing a positive drive in one direction, but riding out of the recesses and so disengaging the driving and driven parts in the other direction. Plungers 38 engage the balls 37, the plungers being fixed to a ring 39 coaxial with the shaft 28 and which is urged toward the sprocket 29 by a spring 40.

There are times when a bottle, advancing on the conveyor, may jam on a point of the star wheel 16. If this occurs, it is necessary that there be some safety device to prevent breakage of the mechanism. This is the purpose of the driving clutch including these balls 37 which escape from the recesses when the pressure becomes too great for safety.

However, if the balls can escape from the recesses when pressure is applied in either direction, then if the conveyor be too heavily loaded with bottles ahead of the star wheel 16, the pressure of the conveyor, forcing these bottles against the star wheel, might cause the wheel to advance ahead of its driving mechanism and thus get out of time. It was, therefore, necessary to shape the recesses in which the balls 37 seat in the gear 29 so that regardless of what pressure is applied to the star wheel, it can only advance at a predetermined rate. The function of the brake 33 is to stop the star wheel 16 if at any time a bottle jams on the point of the wheel and causes disengagement of the driving balls 37. The brake merely stops the wheel until the driving balls index to the next set of holes in the gear. Without the brake, the unit might keep turning although out of time. The brake effects a drag sufficient to keep the star wheel from turning, but this drag is not strong enough to cause the balls 37 to ride out of the recesses. The device is so adjusted that there is a balance between the brake and the driving mechanism so that if a bottle gets out of time with the star wheel 16 (the conveyor being constantly moving) the bottle automatically finds its pocket in the star wheel, the unit stopping only momentarily until the driving balls 37 find the necessary recesses and again start the star wheel into rotation. Since there are four of the recesses 36 and the star wheels 16 have eight recesses, the shaft 17ª, when driving is resumed, will occupy a proper definite relation to the driving sprocket 29. The shaft 25 is connected to the driving sprocket 26 by similar slip clutch connections (not shown).

Referring to Figs. 11 and 12, the hub 20 which carries transfer arms 19, is keyed to a tubular shaft 20ª which turns about a vertical axis in bearings in a frame or casing 41 also secured to the conveyor frame. On the shaft 20ª within the casing or frame 41, there is arranged a gear 42 normally free to turn on the shaft. Within the hollow shaft 20ª there is arranged an axially movable plunger 43 having a handle 44 at its upper end and provided with a spring pressed latch 43ª for retaining it in adjusted position. This plunger carries a clutch key 46 which may be engaged with the gear 42 so as to clutch the latter to the shaft 20ª. By moving the handle 44 downwardly to a sufficient extent the key 46 may be disengaged from the gear 42 thus leaving the shaft 20ª stationary. To hold the shaft in this stationary position, its lower end is preferably embraced by a brake shoe 54 connected by a pin 55 to a stationary part of the frame 41.

The gear 42 meshes with a gear 47 on a shaft 48 which is driven by a sprocket wheel 49 embraced by a sprocket chain 50 which also passes around sprocket wheel 51 (Fig. 10) on the shaft 28. Between the sprocket 49 and the shaft 48, a slip clutch mechanism is arranged, similar to that which connects sprocket 29 to its shaft, as above described, but comprising only two balls (not shown) designed to engage corresponding recesses in the sprocket 49, the balls being urged into their normal operative position by a spring 53 which permits them to be retracted in response to abnormal opposition to turning of the shaft 48. In this instance, the recesses are straight sided drilled holes.

Since there is no pressure against the switch member 19, other than to index the bottles into the second path, it is not necessary that the driving balls act as ratchet elements (as is the case with the balls which drive sprockets 26 and 29 above described), but the brake 54 functions to assist the parts to resume proper operative relation, after being stopped, as above described with reference to the brake 33.

As already noted the sprocket wheels 26 and 29 mesh with the conveyor chain 14ª, or with a chain moving in time with the latter, but as these sprocket wheels are of different diameters, the shafts 25 and 28 are turned at different speeds. Furthermore, since the sprocket 51 is fixed to the sprocket 29 and drives the sprocket 49 and gear 47, the gear 42 is likewise turned in accurate time with the movement of the conveyor chain and with the gears 22 and 23. Obviously, the relative speeds of the gears 22 and 23 might be varied by a change in the relative diameters of the sprockets 26 and 29, but the arrangement herein disclosed by way of example (Fig. 9) is such that the ratio of speed of gear 22 to that of gear 23 is as 3 to 2, and by shifting the knob 30 up and down, so as to clutch one or the other of the gears 22 and 23 to the shaft 17ª, the speed of the star wheel may be varied in a similar ratio, that is a ratio of 3 to 2. On the other hand, the gear 42 is driven at a single speed when it is driven at all. As illustrated, the star wheel has eight recesses for engagement with articles, for instance the bottles R (Fig. 14) on the conveyor, while the transfer device 18 has but two diametrically extending arms 19. As herein illustrated, the gear ratio is such that if, for example, the star wheel 16 be driven at three revolutions per minute (so as thereby to permit twenty-four bottles R to approach the mechanism 18 per minute), every third bottle R' will be engaged by one of the arms 19 and pushed out of line so as to continue along the conveyor in a path rearward of that along which it approached the mechanism 18. On the other hand, if the knob 30 be so manipulated as to reduce the speed of the star wheel so that the latter only delivers sixteen bottles per minute, the speed of the mechanism 18 remaining the same, then the latter will push every second bottle out of its normal path on the conveyor.

As pointed out above, by depressing the knob 44 of the mechanism 18, the rotation of the arms 19 may be stopped. Under these conditions the arms may be arranged to extend substantially parallel to the guide rail 13 so that they do not contact any of the articles moving along the conveyor, the brake device 54 holding the shaft 20ª stationary when thus positioned, or alternatively, the arms 19 may be placed so as to extend diagonally across the conveyor path while remaining stationary, so as to constitute fixed deflector means with which the articles contact as they move along the conveyor, and by means of which they are all diverted into the rearward path.

Referring to Figs. 2 to 8 inclusive, various possibilities of the use of this improved distributing mechanism are illustrated. Thus in Fig. 2, two distributing units 11ª and 11ᵇ are shown as arranged in a system in which three operating units such as the units A, B, C, etc. of Fig. 1, but not shown in Fig. 2, are served by the independent conveyors 1, 2 and 3, respectively, all of which may receive articles from the main conveyor 10. With this arrangement, there is provided a distributing mechanism 11ª and 11ᵇ in advance of each of the individual conveyors 1 and 2, while a stationary deflector D is arranged in advance of the conveyor 3. As illustrated, all three of the operating units are supposed to be running and are to be supplied with articles by the conveyor 10, each of the conveyors 1, 2 and 3 receiving the same number of articles per minute. With this object in view the distributing mechanism 11ª is so adjusted that the transfer arms 19 displace every third article R' into the rear path, leaving the intervening articles R to continue along the front path P'. Those articles R' which are thus displaced to the rear path are received in the conveyor 1 and delivered to the first operating unit. The distributing unit 11$^b$ is so arranged that the transfer arms 19 of this unit engage every second article and push it into the rear path. These articles R$^2$ are received by the conveyor 2 and delivered to the second operating unit, while the intervening articles R continue along the path P$^2$ and eventually engage the fixed deflector D and are delivered to the conveyor 3 and thence to the third operating unit. Thus each operating unit receives the same number of articles supplied by the conveyor 10.

In the arrangement shown in Fig. 3, the first operating unit is out of operation and thus all of the articles supplied by the conveyor 10 are to be divided between the second and third operating units. With this in view the transfer device of the first distributing unit 11$^a$ is made stationary and arranged parallel to the conveyor path. The second operating unit 11$^b$ is arranged to deliver every second article to the rear path on the conveyor so that they are received by the conveyor 2, while the intervening articles continue along the conveyor path and are diverted by the stationary deflector D into the conveyor 3.

In Fig. 4 there is illustrated an arrangement in which the two last operating units are out of action and all of the articles supplied by the conveyor 10 are to be delivered to the conveyor 1 of the first operating unit. For this purpose the transfer device 19 of the unit 11$^a$ is made stationary but arranged in a position such that it deflects all of the articles approaching it into the rearmost path on the conveyor, so that they are all received by the conveyor 1.

In Fig. 5 an arrangement is shown in which the middle operating unit is out of action and the first and third operating units are working. In this arrangement the first distributing unit 11$^a$ is arranged to deflect every second article into the rear path so that they are received in the conveyor 1 permitting the other articles to continue along the path P'. The distributing unit 11$^b$ is arranged so that all articles pass it without being deflected; such articles continue along the path P$^2$ and are caught by the deflector D and diverted into the conveyor 3. With this arrangement the first and third operating units receive the same number of articles.

In Fig. 6 the third operating unit is out of action; the first distributing unit 11$^a$ is arranged to divert every second article into the rear path so that it is received into the conveyor 1 and the second distributing unit 11$^b$ is so arranged that the transfer arms 19 are stationary and act as a deflector for delivering all of the articles passing along the path P' to the conveyor 2.

In Figs. 7 and 8 an arrangement is shown wherein there are four or more operating units. In Fig. 7 the second and third operating units are out of action. The first distributing unit 11$^a$ is set to deliver every third article into the rear path, so that they are received by the conveyor 1. The distributing units 11$^b$ and 11$^c$ are so arranged that they do not deflect any of the units, their transfer arms 19 being stationary and parallel to the conveyor path. The distributing unit 11$^d$ is set to divert every second article into the rear path, so that they are received by the conveyor 4 and delivered to the fourth operating unit. However, intervening articles which are not so deflected into the rear path continue along the conveyor path P$^3$ and may be delivered to another operating unit, or may be returned for recirculation by the conveyor 10, as desired. In Fig. 8 the arrangement is such that every third article is placed in the rear path by the distributing unit 11$^a$ so as to be received by the conveyor 1; the distributing unit 11$^b$ is idle; the distributing unit 11$^c$ delivers every third article into the rear path, to be received by the conveyor 3, and the distributing unit 11$^d$ is idle so that remaining articles pass by the fourth operating unit without entering the conveyor 4.

The above suggested arrangements are indicative of the great versatility of this mechanism, and its applicability to a series of operating units of greater or lesser extent, and of the possibility, by the use of this improved distributing means, of diverting more or less articles supplied by a continuously moving conveyor into various paths and of thereby distributing such articles evenly among a series of operating units, or unevenly, as may be desired.

While as suggested in Fig. 1, there is a distributing unit in advance of each of the operating units A, B, C, D, etc., it is contemplated that the later operating units of the series may be supplied with articles from the conveyor path by means of fixed deflectors or plows such as the deflector D shown in Figs. 2 to 6 inclusive, or other types of dividing plow or deflector such as are customarily employed in apparatus of this type, it being noted that at the portions of the conveyor 10 which advance the articles for delivery to the last operating units of the series, the number of articles passing a given point per minute is much less than at the beginning of the series. Thus there is little difficulty in separating the articles by fixed plows. However, for smooth operation and capability of variation in distribution, it is preferred to use the improved distributor mechanism of the present invention at each dividing point.

While a desirable embodiment of the invention has been disclosed by way of example, it is to be understood that the invention is broadly inclusive of any and all modifications falling within the scope of the appended claims.

I claim:

1. In combination with a conveyor operative to advance articles, one after another in succession along a predetermined path at a rate to supply all of a plurality of independently operating units, any one of which may be stopped without affecting the operation of the others, a plurality of power-driven selectors each capable of diverting recurrent articles from said path as they approach one of said operating units respectively, each selector comprising a spacer device and a transfer device each normally moving in time with the conveyor and operative at will to deliver an equal number of the advancing articles to each of the entire number of said operating units, or to deliver an equal number of the advancing articles to each of any number of said units, less than the total number which at a given time are operating.

2. In combination with a conveyor operative to advance articles one after another in succession along a predetermined path at a rate to supply all of a plurality of independently operating units, any one of which may be stopped without affecting the operation of the others, a plurality of power-driven selectors each capable of diverting recurrent articles from said path as they approach one of said operating units respectively, each selector comprising a spacer operative to space approaching articles along the conveyor at different intervals at will, a transfer element, and means for moving it at a constant invariable speed, the transfer element being operative to move articles with which it engages into a different path, the number of articles as compared with the total number approaching the divider, which are engaged by the transfer element, varying with their spacing.

3. In combination with a conveyor operative to advance articles one after another in succession along a predetermined path at a rate to supply all of a plurality of independently operating units, any one of which may be stopped without affecting the operation of the others, a plurality of power-driven selectors each capable of diverting recurrent articles from said path as they approach one of said operating units respectively, each selector comprising a rotary star wheel turning in timed relation to the speed of the conveyor and operative to engage advancing articles and to dispose them in spaced relation for continued advance by the conveyor, a rotary transfer element also turning in timed relation to the speed of the conveyor, and means whereby the star wheel may be caused to turn at any one of the several selected speeds relatively to the speed of the transfer element whereby the latter may be caused to engage articles recurring at different intervals respectively.

4. Article-segregating mechanism for use with a chain conveyor on which articles are supported and which has a supporting surface of a width at least approximating twice the width of the articles being conveyed, said segregating mechanism comprising a rotary gate, a rotary transfer arm, and mechanism actuated by the conveyor for turning the gate and arm, the arm being spaced from the gate longitudinally of the conveyor in the direction of article movement, the mechanism which turns the gate and transfer arm being so constructed and arranged that the transfer arm turns, when operating, always at substantially the same speed while the gate may be turned at will at different speeds.

5. Article-segregating mechanism for use with a chain conveyor on which articles are supported and which has a supporting surface of a width at least approximating twice the width of the articles being conveyed, said segregating mechanism comprising a rotary gate, a rotary transfer arm, and mechanism actuated by the conveyor for turning the gate and arm, the arm being spaced from the gate longitudinally of the conveyor in the direction of article movement, the mechanism which turns the gate and transfer arm being so constructed and arranged that the transfer arm may be turned at a single predetermined speed or stopped at will, and the gate may be turned at each of two different speeds at will.

6. Article-distributing mechanism for use with a conveyor, said mechanism including a rotary gate and a rotary transfer device, and actuating means driven in time with the conveyor for turning the gate and transfer device, said actuating means comprising parts so constructed and arranged that the gate may be turned at either of several predetermined speeds and the transfer device may be turned or held stationary at will.

7. Article-distributing mechanism for use with a conveyor, said mechanism including a rotary gate and a rotary transfer device and actuating means driven in time with the conveyor for turning the gate and transfer device, said actuating means comprising means for turning the gate at different selected speeds and for turning the transfer device or for holding it stationary at will, and brake means operative temporarily to stop the gate.

8. Article-distributing mechanism for use with a conveyor, said mechanism including a rotary gate and a rotary transfer device, actuating means driven in time with the conveyor for turning the gate and transfer device, said actuating means comprising clutch means operative at will to connect the transfer device to or to disconnect it from the driving element, and means for holding the transfer device stationary when disconnected from its drive element.

9. Article-distributing mechanism for use with a conveyor, said mechanism including a rotary gate and a rotary transfer device, and means driven in time with the conveyor for turning the gate and transfer device, said turning means comprising a shaft on which the gate is mounted, a pair of gears turning at relatively different speeds, and means operative at will to connect the shaft to either of said gears.

10. Article-distributing mechanism for use with a conveyor, said mechanism including a rotary gate and a rotary transfer device and actuating means, driven in time with the conveyor for turning the gate and transfer device, said actuating means comprising a hollow shaft on which the gate is mounted, a plurality of gears coaxial with the shaft, means for driving the gears at different relative speeds, a plunger within and movable axially of the hollow shaft, and clutch means actuable by the plunger for clutching either gear to the shaft at will.

11. Article-distributing mechanism for use with a conveyor, said mechanism including a rotary gate and a rotary transfer device, and actuating means driven in time with the conveyor for turning the gate and transfer device, said actuating means comprising a yieldable clutch device operative to permit either the gate or the transfer device to stop in response to jamming of articles on the conveyor.

12. Article-distributing mechanism for use with a conveyor, said mechanism including a rotary gate and a rotary transfer device and actuating means, driven in time with the conveyor, for turning the gate and transfer device, said actuating means comprising a yielding clutch device operative to permit the gate or the transfer device to stop while the drive element continues to operate, said clutch comprising detent means so arranged that upon resumption of rotation of the stopped part, a definite predetermined angular relation between the stopped part and its driving element is assured.

13. Article-distributing mechanism for use with a conveyor, said distributing mechanism including a rotary gate and a rotary transfer device, and actuating means driven in time with the conveyor for turning the gate and transfer device, said actuating means comprising a shaft on which the transfer device is mounted, a gear, means including a friction clutch for driving the gear, and a manually actuable clutch operative at will positively to connect the shaft to the gear or to disengage it therefrom.

14. Article-distributing mechanism for use with a conveyor, said mechanism including a rotary gate and a rotary transfer device, and actuating means driven in time with the conveyor for turning the gate and transfer device, said actuating means comprising a pair of spaced parallel shafts on one of which the gate is mounted and on the other of which a two-armed transfer device is mounted, a pair of gears turning at different speeds, alternatively operative to drive the first shaft, a gear for driving the second shaft, means operative at will to clutch the first shaft to either of the first-named gears, the ratio of speeds of the several gears being such that when one of the gears is connected to the first shaft the articles are so spaced by the gate that one of the transfer arms engages every third article on the conveyor and when the other of said gears is clutched to the first shaft, every second article on the conveyor is engaged by one of the transfer arms.

15. Separating means for conveyor-supported articles, comprising means for spacing articles at substantially equal distances apart lengthwise of the conveyor, a power drive for the spacer means moving in time with the conveyor, transfer means operative to move articles transversely of the conveyor, power drive means for the transfer means, independent of the drive for the spacer means, including a manually controllable power transmitting clutch, the parts being so constructed and arranged that disengagement of the clutch stops the transfer means without stopping the spacer means.

16. Separating means for conveyor-supported articles, comprising a rotary transfer device operative to move articles engaged by it transversely of the conveyor, a power actuated drive for the transfer device normally moving the latter in time with the conveyor, said drive including a manually controllable clutch whereby the driving of the transfer device may be stopped at will, spacer means operative to release, at predetermined intervals, articles delivered to it by the conveyor for presentation by the conveyor to the transfer device, and power drive means, independent of the transfer means, for operating the spacer means whereby the latter may be continued in operation while the transfer device is stopped.

17. In combination with means for moving articles along either of a plurality of parallel paths, a transfer device comprising a rotary arm which sweeps across one at least of said paths and which is operative when engaged by an article moving along said path to transfer the article into another of said paths, and spacing means comprising a power driven rotating gate operative to engage and to release articles moving along said first path at definite spaced intervals such that recurrent articles only are engaged by the rotating arm of the transfer device and transferred to the other path.

18. In combination with means for moving articles along either of a plurality of parallel paths, a transfer device comprising a rotary arm which sweeps across one at least of said paths and which is operative when engaged by an article moving along said path to transfer the article into another of said paths, and spacing means comprising a rotating gate operative to engage and to release articles moving along said first path at definite spaced intervals such that recurrent articles only are engaged by the rotating arm of the transfer device and transferred to the other path, and power actuated means for driving said gate at different selected speeds thereby to deliver articles at correspondingly different intervals for operative engagement with the transfer device.

19. In combination with means for moving articles along either of a plurality of parallel paths, a transfer device comprising a part movable transversely of one of said paths at least and operative when engaged by an article moving along said path to move the article into another of said paths, and spacing means operative to release articles moving along the first path at predetermined intervals such that recurrent articles only moving along the first path will be engaged by the transfer device and moved into the other path, the spacing means being adjustable thereby to permit variation in the intervals between successive articles.

20. In combination with a conveyor on which articles rest and which is of a width such that articles resting thereon may move along either of two parallel paths, power driven transfer means moving in time with the conveyor comprising a rotary shaft carrying an arm arranged to sweep across the conveyor and to move an article engaged by the arm from one of said paths to the other, and a power driven rotary gate turning in timed relation to the movement of the conveyor and which is operative to deliver articles for movement by the conveyor along one of said paths at a rate such that regularly recurring articles only are engaged by the transfer means.

21. In combination with a conveyor on which articles rest and which is of a width such that articles resting thereon may move along either of two parallel paths, a power driven transfer device comprising a rotary shaft carrying an arm arranged to sweep across the conveyor and to move an article engaged by the arm from one of said paths to the other, and a star wheel, and mechanism for transmitting motion from the conveyor to the star wheel, said mechanism being constructed and arranged to permit the star wheel to be driven selectively at different speeds, the star wheel moving in timed relation to the conveyor and transfer arm, and being operative to space articles moving along one of said paths so that regularly recurrent articles only are engaged by the transfer arm.

22. In combination with a conveyor on which articles rest and which is of a width such that articles resting thereon may move along either of two parallel paths, power driven transfer means comprising a rotary shaft carrying an arm arranged to sweep across the conveyor and to move an article engaged by the arm from one of said paths to the other, and a power driven rotary star wheel, turning in timed relation to the conveyor and transfer arm, operative to space articles moving along one of said paths so that regularly recurrent articles only are engaged by the transfer arm.

23. In combination with a conveyor on which articles rest and which is of a width such that articles resting thereon may move along either of two parallel paths, transfer means comprising a rotary shaft carrying an arm arranged to sweep across the conveyor and to move an article engaged by the arm from one of said paths to the other, and a rotary star wheel, turning in timed relation to the conveyor and transfer arm, operative to space articles moving along one of said paths so that regularly recurrent articles only are engaged by the transfer arm, and means operative to vary the speed of rotation of the star wheel thereby to vary the interval occurring between articles operatively engaged by the transfer arm.

24. In combination with a conveyor on which articles rest, and which is of a width such that the articles resting on the conveyor may move along in either of two parallel paths, selector means comprising a rotary shaft carrying a pair of transfer arms 180° apart, each arm being arranged to sweep across the conveyor and to move all articles engaged by an arm from one path to the other, a rotary star wheel spaced from the selector means in the direction from which the articles approach the latter, the star wheel being arranged to engage articles moving along one path and to release them for continued movement along said path at intervals determined by the rate of rotation of the star wheel, and driving means for the star wheel operative to turn it at selectively different speeds, the several possible speeds of the star wheel being such that at any speed it so delivers articles that recurrent articles only are engaged by the transfer arms.

SIDNEY T. CARTER.

REFERENCES CITED

The following references are of record in the file of this patent:

UNITED STATES PATENTS

| Number | Name | Date |
|---|---|---|
| 1,140,807 | Englar | May 25, 1915 |
| 1,906,605 | Hutchinson | May 2, 1933 |
| 2,085,410 | Bergmann | June 29, 1937 |

FOREIGN PATENTS

| Number | Country | Date |
|---|---|---|
| 818,058 | France | June 7, 1937 |